United States Patent [19]

Keane et al.

[11] Patent Number: 4,493,873

[45] Date of Patent: Jan. 15, 1985

[54] CORONA-RESISTANT WIRE ENAMEL COMPOSITIONS AND CONDUCTORS INSULATED THEREWITH

[75] Inventors: John J. Keane, Ballston; Denis R. Pauze, Scotia, both of N.Y.

[73] Assignee: General Electric Company, Schenectady, N.Y.

[21] Appl. No.: 480,627

[22] Filed: Mar. 30, 1983

Related U.S. Application Data

[62] Division of Ser. No. 374,844, May 5, 1982.

[51] Int. Cl.³ ........................ B32B 9/00; B32B 15/00; B32B 27/00; H01B 7/00

[52] U.S. Cl. ............................ 428/372; 174/120 SR; 428/383; 428/384; 428/389; 427/118; 427/120

[58] Field of Search ............... 428/372, 375, 379, 380, 428/383, 384, 389; 427/118, 120; 174/110 PM, 110 N, 110 SR, 110 E, 120 SR, 127

[56] References Cited

U.S. PATENT DOCUMENTS

| | | | |
|---|---|---|---|
| 2,671,069 | 3/1954 | Savage | 524/430 |
| 2,888,424 | 5/1959 | Precopio et al. | 524/430 |
| 2,997,526 | 8/1961 | Kessel et al. | 336/96 X |
| 3,228,883 | 1/1961 | DiGiulio | 174/110 PM |
| 3,361,593 | 1/1968 | Sattler et al. | 174/120 SR |
| 3,742,084 | 6/1973 | Olyphant, Jr. et al. | 428/379 |
| 3,962,531 | 6/1976 | Lever et al. | 174/120 SR |
| 4,255,471 | 3/1981 | Boldebuck et al. | 428/395 X |
| 4,342,814 | 8/1982 | Usuki et al. | 428/372 |

FOREIGN PATENT DOCUMENTS

| | | | |
|---|---|---|---|
| 55-9634 | 1/1980 | Japan | 524/430 |

*Primary Examiner*—Lorraine T. Kendell
*Attorney, Agent, or Firm*—Donald J. Voss

[57] ABSTRACT

A corona-resistant wire enamel composition is described comprising a polyimide, polyamide, polyester, polyamideimide, polyesterimide, or polyetherimide resin and from about 1% to about 35% by weight of dispersed alumina particles of a finite size less than about 0.1 micron, the alumina particles being dispersed therein by high shear mixing. A method of providing corona resistant one and two-stage insulations for an electrical conductor employing the above compositions and an electrical conductor insulated with a one or two-stage coating of the wire enamel compositions are also disclosed.

3 Claims, 1 Drawing Figure

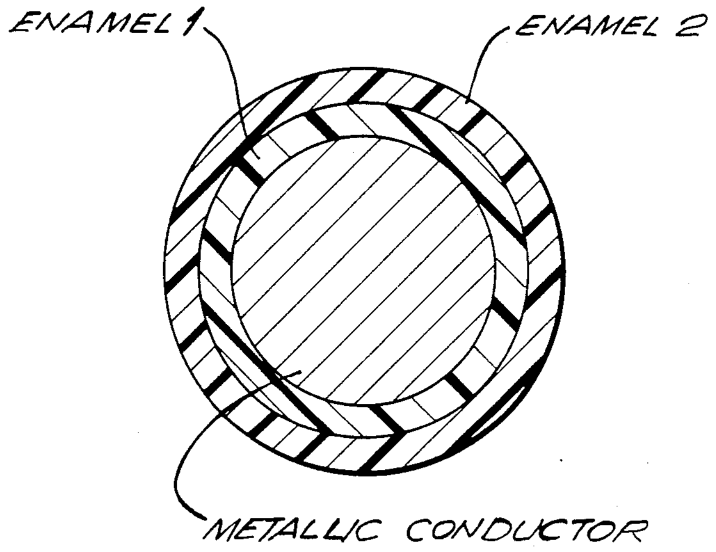
ENAMEL 1
ENAMEL 2
METALLIC CONDUCTOR

CORONA-RESISTANT WIRE ENAMEL COMPOSITIONS AND CONDUCTORS INSULATED THEREWITH

This application is a division of application Ser. No. 374,844, filed May 5, 1982.

CROSS-REFERENCE TO RELATED APPLICATION

This application is related to U.S. patent application Ser. No. 145,947 filed May 2, 1980 which in turn is a continuation-in-part of U.S. patent application Ser. No. 061,700 filed July 30, 1979, now abandoned. The three applications are assigned to the same assignee.

BACKGROUND OF THE INVENTION

This invention relates to corona-resistant wire enamel compositions and conductors insulated therewith.

Dielectric materials used as insulators for electrical conductors may fail as a result of corona occurring when the conductors and dielectrics are subjected to voltages above the corona starting voltage. This type of failure may occur for example in certain electric motor applications. Corona induced failure is particularly likely when the insulator material is a solid organic polymer. Improved dielectric materials having resistance to corona discharge-induced deterioration would therefore be highly desirable. For some applications, mica-based insulation systems have been used as a solution to the problem, whereby corona resistance is offered by the mica. Because of the poor physical properties inherent in mica, however, this solution has been less than ideal because of the relatively large amount of space that the mica based compositions require.

Solid, corona-resistant dielectric materials are particularly needed for high-voltage apparatus having open spaces in which corona discharges can occur. This is especially true when the space is over approximately 1 mil in thickness and is located between the conductor and the dielectric, or when there is a void located in the dielectric material itself. The service life of the dielectric is much shorter when these gaps or spaces are present.

Resins containing a minor amount of an organometallic compound of either silicon, germanium, tin, lead, phosphorus, arsenic, antimony, bismuth, iron, ruthenium or nickel are disclosed by McKeown (U.S. Pat. No. 3,577,346) as having improved corona resistance. Corona lives of up to four hundred times that of polymers without the organometallic additive are disclosed.

A composition having anti-corona properties is disclosed by DiGiulio et al, in U.S. Pat. No. 3,228,883, to consist of a mixture of ethylene-alpha-olefin copolymer, a homo- or copolymer covulcanizable therewith and a nonhydroscopic mineral filler, such as zinc, iron, aluminum or silicon oxide. However, there is no appreciation whatsoever in this patent that the use of submicron-sized alumina or silica particles is necessary to achieve significant improvement in corona resistance.

A molded epoxy resin composition which contains hydrated alumina and silica is disclosed by Linson, in U.S. Pat. No. 3,645,899, as having good weathering and erosion resistance, but appears to have no particular resistance to corona breakdown.

Polyethylene resin with various fillers, including alumina and silica, appears to be disclosed in U.S. Pat. No. 2,888,424 issued May 26, 1959 to Precopio et al. But again, there is no concern or appreciation of corona-resistant properties; the fillers, including such counterproductive materials for corona properties as carbon black, are added only to improve mechanical properties.

Thus, there is a continuing need for corona-resistant materials which are easily fabricated for use as electrical insulation and a further need for additives which can convert dielectric materials susceptible to corona damage to corona-resistant materials. Accordingly, it is the principal object of the present invention to provide a corona-resistant resin, useful in various electrical insulation forms to satisfy these long-felt needs.

SUMMARY OF THE INVENTION

The present invention provides a corona-resistant wire enamel composition which comprises a polyimide, polyamide, polyester, polyamideimide, polyesterimide or polyetherimide resin and approximately 1% to approximately 35% by weight of submicron-sized particles of alumina. The aluminum in the alumina is atomically bound only with oxygen.

It is preferred to employ fumed alumina. The alumina is dispersed in the wire enamel composition with high shear mixing, preferably, in a concentration ranging from about 1 to 20 parts by weight per hundred parts of the resin. The alumina particles are preferably less than about 0.1 micron in size. Also, a method of providing corona-resistant insulation for an electrical conductor employs the above-mentioned composition. The method comprises applying the composition to the conductor, for example wire, by using multi-pass coating and wiping dies and curing between about 330° C. and 370° C., at varying speeds.

It was noted that if dispersion was not accomplished with high shear mixing, it was impossible to obtain the smooth continuous coating that is required to produce any insulating film in the minimal thickness required in producing commercial electrically insulated wire.

Accordingly, in its broad aspects the present invention comprises a corona-resistant wire enamel composition which comprises a polyimide, polyamide, polyester, polyamideimide, polyesterimide or polyetherimide resin and approximately about 1% to about 35% by weight of submicron-sized particles of alumina, dispersed therein by high shear mixing, and to the method of preparing such composition by high shear mixing of the alumina particles in the aforesaid resins. The improvements provided by the subject invention are not only observed in the high temperature resistant resins such as polyimides, but also provide dramatically improved corona resistance for resins generally recognized as low-temperature capability materials, such as polyamides (Nylon) and polyesters.

In accordance with another aspect of this invention the corona-resistant wire enamel compositions are applied to coat conductors or conductor wires by using multi-pass coating and wiping dyes and curing between about 330° C. and 370° C. at varying speeds to obtain a smooth continuous coating.

In accordance with still another aspect of this invention, a corona-resistant two-stage wire enamel system is provided which comprises a first layer of a polyimide, polyamide, polyester, polyamideimide, polyesterimide or polyetherimide resin and a second layer coated over the first layer of a polyimide, polyamide, polyester, polyamideimide, polyesterimide or polyetherimide resin, wherein the resins of the first and second layers differ and wherein at least one of the first or second layers includes from about 1% to about 35% by weight of submicron-sized particles of alumina, dispersed therein by high shear mixing, and to conductors insulated therewith.

The corona-resistant wire enamel compositions and the corona-resistant wire enamel systems of the subject invention provide superior electrical insulating systems.

BRIEF DESCRIPTION OF THE DRAWING

The drawing is an elevated cross sectional view of conductive wire insulated with the new and improved two stage wire enamel insulation of the subject invention.

DETAILED DESCRIPTION OF THE INVENTION

Resins useful for the practice of this invention include, for example, polyimide, esterimide or etherimide resins, PYRE ML ® which is available from E. I. Dupont De Nemours & Co., and an esterimide available under the trademark IMIDEX-E from General Electric Company. An example of etherimide is ULTEM ETHERIMIDE ® obtainable from General Electric Company.

Esterimide resins useful in the practice of this invention include those used to coat magnet wire. Examples of compositions which may be used are disclosed in U.S. Pat. Nos. 3,426,098 and 3,697,471.

The alumina employed in the present invention has a particle size of less than about 0.1 micron. Preferably, the alumina has a particle size of from approximately 0.005 to approximately 0.05 micron, as may be obtained either by the gas phase hydrolysis of the corresponding chloride or other halide, or as may be obtained by precipitation. The aluminum oxide when disposed or dispersed within the resin material, forms chain-like particle networks. The aluminum oxide particles useful in the present invention and formed from the gas phase is also known as fumed aluminum oxide or fumed alumina. Typical of commercially available fumed alumina is that manufactured and sold by Degussa, Inc. under the trade name Aluminum Oxide C ®.

From approximately 1% to approximately 35% by weight of submicron alumina are used in the resin compositions of this invention, while a loading of approximately 15% by weight is preferred. A preferred range is from about 1 to about 20 parts of alumina particles to 100 parts by weight of resin.

As can be seen from the tables below the use of submicron particles is critical for the use of the alumina. Table I shows that polyimide films fail after an average of only 9 hours under the test conditions described herein and under the voltage stress shown. In stark contrast, the use of 20% dispersed alumina having an average particle size of approximately 0.020 microns produces average sample life in excess of 2776 hours. The use of 40% finely ground alumina having a particle size in excess of one micron produced better results than no additive but significantly worse results than the submicron sample.

TABLE I

| Sample | Stress Volts/Mil | Hours to Fail for various Samples | Average |
|---|---|---|---|
| Polyimide film | 250 | 7, 8, 13 | 9 |
| Polyimide film with 20% alumina of 0.020 micron size | 250 | 2187, 3071+, 3071+ | 2776+ |
| Polyimide film with 40% alumina of greater than 1 micron size | 208 | 78, 130, 513, 310 | 258 |

TABLE I-continued

The "+" sign in the tables indicates that the sample had still not failed at the time the data was taken.

In one aspect of the invention, a dispersion of the submicron alumina particles in resin prepared by high shear mixing is used to treat laminated electrical components wherein the resin acts as a binder. The laminate may be prepared by coating a dispersion of the submicron alumina in resin or solvent between layers during the lay-up of the laminate. The laminates, after being subjected to heat and pressure under conventional conditions to cure the laminates, have greatly enhanced resistance to corona-induced deterioration and improved insulating properties.

In a preferred aspect, this invention relates to a conductor or conductor wire coated with the resin, i.e., the polyimide, polyamide, polyester, polyamideimide, polyesterimide or polyetherimide resin containing the submicron alumina particles, as described above. In another preferred aspect, this invention relates to a conductor or conductor wire coated in two stages with a first layer coating of one resin and a second layer coating over the first layer of a different resin as depicted in the figure, with at least one layer containing the submicron alumina particles as described above.

As pointed out hereinabove, to obtain the smooth continuous coating that is required to produce an insulating film in the minimal thickness required in producing commercial electrically insulated wire, for example, copper, silver, stainless steel or aluminum wire, the fumed alumina is dispersed in the resin by means of high shear mixing, in, for example, a high energy mixing device such as differential speed rolling mill or by high speed agitation (for example, in a Cowles unit). The resulting composition is applied to the wire using multipass coating and wiping dies and curing temperatures between about 330° C. and 370° C. at varying speeds.

Wire speeds may vary anywhere from 2 to 120 ft/min. or more depending on the type of substrate being coated. The build-up enamel on the wire can be 0.002 to 0.010 inch and in normal practice is about 0.003 inch (3 mils).

The coating yield products which exhibit greatly enhanced resistance to corona-induced deterioration. An additional advantage from incorporation of the fumed alumina in the particular resins is that the space factor in a motor coil is reduced which allows for a smaller coil design or a greater quantity of copper in a given coil size resulting in larger horsepower and more compact motors.

In using the resin compositions of this invention to provide insulated conductors resistant to corona-induced deterioration the conductor can also be wrapped with an insulating paper, e.g., mica paper tape, impregnated with a resin composition of this invention.

The following examples depict in more detail the preparation and use of representative compositions in accordance with the principles of this invention. Standardized test conditions and apparatus, described as follows, were used in all of the examples hereinafter described.

The corona test apparatus comprises a needle electrode, a plane electrode and a sample of dielectric material therebetween. The test consists of applying a potential of 2500 volts A.C. between the needle electrode and the plane electrode at a frequency of 3000 Hertz.

Dimensions of the samples used in the corona lifetime evaluations were standardized at 30 mils ($7.6\times10^{-2}$ cm.) thickness. The distance between the point of the needle and the surface of the dielectric was 15 mils ($3.8\times10^{-2}$ cm.). Corona lifetimes were determined in atmospheres of air and/or hydrogen. Test results, were data averages and ranges are given, are based on four to six samples of a given composition.

A suitable polyesterimide wire enamel may be made according to procedure A.

PROCEDURE A

A polyesterimide wire enamel is made by charging a suitably sized flask with the following ingredients:

| INGREDIENTS | PARTS BY WEIGHT |
|---|---|
| Ethylene glycol | 214.2 |
| Terephthalic acid | 582.5 |
| Tris(2-hydroxyethyl) isocyanurate | 820.7 |
| Tetraisopropyl titanate | 22.2 |
| Cresylic acid | 1076.4 |
| Methylene dianiline | 298.1 |
| Trimellitic anhydride | 574.0 |

The ingredients are heated during about 2 hours at about 215° C. and held at this temperature for about 8 to 10 hours. Then enough cresylic acid is added to reduce the solids content to 27% by weight and the mixture is maintained at about 200° C. for 8 hours, until it is completely homogeneous.

EXAMPLE I

This test illustrates the improved corona resistance imparted to various wire enamels by the addition of submicron-sized particulate alumina.

The following wire enamel compositions were prepared:

| | COMPOSITIONS | | | | | |
|---|---|---|---|---|---|---|
| COMPONENTS | 1* | 2 | 3* | 4 | 5 | 6 |
| Polyimide wire enamel[a] | X | X | — | — | — | X |
| Polyesterimide wire enamel[b] | — | — | X | X | — | — |
| Polyetherimide wire enamel[c] | — | — | — | — | X | — |

-continued

| | COMPOSITIONS | | | | | |
|---|---|---|---|---|---|---|
| COMPONENTS | 1* | 2 | 3* | 4 | 5 | 6 |
| Alumina[d] | — | 15% | — | 15% | 15% | 35% |

[a]PYRE ML wire enamel made from pyromellitic anhydride and oxydianiline containing about 14% solids available from E. I. Dupont de Nemours & Company.
[b]IMIDEX E a polyesterimide resin containing about 27% solids, available from General Electric Company.
[c]ULTEM a polyetherimide resin containing about 25% solids, prepared by reaction of an aromatic bis(etheranhydride) with an organic diamine as described in U.S. Pat. No. 3,847,867, available from General Electric Company.
[d]ALON a fumed alumina having a particle size of about 0.03 microns, prepared by hydrolysis of aluminum chloride in a flame process, available from Cabot Corporation, (percent added based upon enamels solids).
*Control Each of the samples containing the ALON ® had the alumina dispersed in the enamel solution by high speed agitation in a Cowles unit or by rolling on a 3 mil paint roll for 12 hours to provide high sheer mixing.

The enamels were applied to 18 AWG copper wire using multipass coating and wiping dies and heating to temperatures of 330° C. to 370° C. at speeds of 15 and 20 feet per minute to build a coating on the wire of 3.0 mil thickness at each coating speed.

The wire enamels had the following properties:

| PROPERTY | 1 | 2 | 3 | 4 | 5 | 6 |
|---|---|---|---|---|---|---|
| Surface | — | good | — | good | good | good |
| Flexibility 25% + 3x | — | poor | — | good | good | shattered at 15% elongation. |

Each of the enamels were cast to a thickness of 30 mils on a metal pate. A needle point electrode was placed above the sample with a gap of 15 mils between the needle and the surface of the enamel. The enamels were tested at various stresses and time to corona failure was recorded. The results were as follows:

| | 1 | 2 | 3 | 4 | 5 | 6 |
|---|---|---|---|---|---|---|
| CORONA RESISTANCE IN HOURS | 100 hrs. at 450 v/mil. | 100 hrs. at 750 v/mil. | 200 hrs. at 650 v/mil. | 10,000 hrs. at 650 v/mil | 100 hrs. at 750 v/mil. | — |

The addition, by high shear mixing, of submicron-sized alumina to wire enamel resin compositions improved the corona resistance of the wire enamel.

EXAMPLE II

This test illustrates the dramatic improvements in corona resistance imparted to a two-stage wire enamel system by the addition of submicron-sized particulate alumina to at least one stage thereof.

Wire enamel compositions were prepared by dispersing the stated amounts of alumina in the pre-formed wire enamels:

| | A* | B* | C | D |
|---|---|---|---|---|
| Polyester wire enamel | X | | X | |
| Nylon wire enamel | | X | | X |
| ALON ® | | | | |

*Control

The polyester wire enamel may be prepared according to U.S. Pat. No. 2,936,296, Example 1. The nylon wire enamel may be prepared by dissolving 14.0 grams of 6,6-nylon in 58.0 grams of a mixture of phenol and cresol and 28.0 grams of naphtha.

Alumina was dispersed in the enamel compositions C and D by high speed agitation in a Cowles unit or by rolling on a 3 mil paint roll for 12 hours to provide high shear mixing.

Two stage wire enamel systems were applied to 18 AWG copper wire in accordance with the procedure of Example I. More particularly, the selected first stage enamel was applied to 18 AWG copper wire using multipass coating and wiping dies and heating to temperatures of 330° C. to 370° C. at speeds of 15 and 20 feet per minute to build a coating on the wire of 3.0 mil thickness at each coating speed.

The procedure was repeated with the selected second stage enamel such that the second stage enamel was applied as a top coat over the first stage on the coated copper wire.

The following two-stage wire enamel systems were prepared according to this procedure utilizing wire enamel compositions A–D prepared above:

| ENAMEL SYSTEMS | 1 | 2 | 3 |
|---|---|---|---|
| base coat enamel | A | C | A |
| top coat enamel | B | B | D |

Each of the enamel systems exhibited good flexibility. Each of the above enamel systems were cast to a thickness of 30 mils on a metal plate, the first and second enamel stages each being cast to a thickness of 15 mils. A needle point electrode was placed above the sample with a gap of 15 mils between the needle and the surface of the enamel system as in Example 1. The enamel systems were tested at 600 V/mil and time to corona failure was recorded. The results were as follows:

| ENAMEL SYSTEM | HOURS OF LIFE AT 600 V/Mil |
|---|---|
| 1 (unfilled polyester/ unfilled Nylon) | 1100 hrs. |
| 2 (filled polyester/ unfilled Nylon) | 2200 |
| 3 (unfilled polyester/ (filled Nylon) | 2200+* |

-continued

*Still under testing upon submission of the data.

The addition, by high shear mixing, of submicron-sized alumina, to at least one stage of a two-stage wire enamel system improved the corona resistance of the system.

In summary, the subject invention provides new and improved corona-resistant insulating materials which comprise wire enamels based on polyimides, polyesters, polyesterimides, polyamideimides, polyetherimides, etc. which are formulated to include about 1% to about 35% of submicron or microscopic particles of alumina, dispersed therein by high shear mixing, which when applied to an electrical conductor such as an electrical wire, provides such wire with a continuous coating which exhibits high corona resistance.

The above-mentioned patents or applications are all incorporated herein by reference. Although the invention has been described with reference to particular preferred embodiments, it is apparent that modification or changes may be made therein by those skilled in the art without varying from the scope and spirit of the subject invention, as defined by the appended claims.

What is claimed is:

1. An electrical conductor insulated with corona-resistant two-stage insulation system comprising: a first insulating layer disposed peripherally around said conductor formed of a cured polyester, polyamideimide or polyesterimide resin; and a second insulating layer disposed peripherally around said first layer formed of a cured polyamide resin, wherein the resins forming said first and second layers are different, and wherein either said first layer or said second layer further comprises from about 1% to about 35% by weight of alumina particles of a finite size of less than approximately 0.1 micron, disposed within said resin by high shear mixing.

2. An electrical conductor as recited in claim 1 wherein the alumina particles comprise fumed alumina of particle size from approximately 0.005 microns to approximately 0.50 microns.

3. An electrical conductor as recited in claim 1 wherein said first insulating layer is polyester.

* * * * *